(12) United States Patent
Cheung et al.

(10) Patent No.: US 10,772,141 B2
(45) Date of Patent: Sep. 8, 2020

(54) SYSTEM AND METHOD FOR PEER-TO-PEER WIRELESS COMMUNICATION

(71) Applicant: The Chinese University of Hong Kong, Shatin (HK)

(72) Inventors: Waiman Cheung, Shatin (HK); Sung-Chi Chu, Sai Kung (HK); Chun Yip Leung, Tuen Mun (HK); Kwong Man Cheng, Yuen Long (HK); Pan Kwok, Tsuen Wan (HK)

(73) Assignee: The Chinese University of Hong Kong, Shatin, New Territories (HK)

( * ) Notice: Subject to any disclaimer, the term of this patent is extended or adjusted under 35 U.S.C. 154(b) by 0 days.

(21) Appl. No.: 16/022,584

(22) Filed: Jun. 28, 2018

(65) Prior Publication Data
US 2020/0008251 A1    Jan. 2, 2020

(51) Int. Cl.
| | | |
|---|---|---|
| *H04W 76/14* | (2018.01) | |
| *H04W 12/04* | (2009.01) | |
| *H04W 12/06* | (2009.01) | |
| *H04L 29/08* | (2006.01) | |

(52) U.S. Cl.
CPC ........... *H04W 76/14* (2018.02); *H04L 67/104* (2013.01); *H04W 12/04* (2013.01); *H04W 12/06* (2013.01)

(58) Field of Classification Search
CPC ...... H04W 76/14; H04W 12/04; H04L 67/104
See application file for complete search history.

(56) References Cited

U.S. PATENT DOCUMENTS

| | | |
|---|---|---|
| 4,659,481 A | 4/1987 | Chen |
| 4,659,482 A | 4/1987 | Chen |
| 4,701,262 A | 10/1987 | Chen |
| 4,732,698 A | 3/1988 | Chen |
| 4,759,851 A | 7/1988 | Chen |
| 4,895,663 A | 1/1990 | Chen |
| 4,944,885 A | 7/1990 | Chen |
| 5,157,489 A | 10/1992 | Lowe |

(Continued)

OTHER PUBLICATIONS

Chu, et al., "On IoT Impact of Supply Chain Visibility," The Fifteenth International Conference on Electronic Business, Hong Kong, Dec. 6-10, 2015, 5 pages.

(Continued)

*Primary Examiner* — Zhensheng Zhang
(74) *Attorney, Agent, or Firm* — Kilpatrick Townsend & Stockton LLP

(57) ABSTRACT

Methods and systems for peer-to-peer communication are provided. In one example, a first device may receive, from a server, a pairing code and a first handshake code. The first device may transmit at least a first portion of the pairing code in a first broadcast message and receive, from the second device, a second broadcast message. The first device may authenticate the second device based on at least a second portion of the pairing code in the second broadcast message. The first device may establish a wireless peer-to-peer communication channel with the second device, and receive, from the second device, a second handshake code via the wireless peer-to-peer communication channel. The first device may authorize the second party to engage in an offline interaction with the first party based on the first handshake code and the second handshake code.

20 Claims, 8 Drawing Sheets

(56) References Cited

U.S. PATENT DOCUMENTS

| | | | |
|---|---|---|---|
| 5,715,764 | A | 2/1998 | Lyngfelt et al. |
| 6,034,015 | A | 3/2000 | Lin et al. |
| 6,185,174 | B1 | 2/2001 | Belser |
| 6,374,596 | B2 | 4/2002 | Taga et al. |
| 6,737,483 | B1 | 5/2004 | Tomov et al. |
| 7,115,851 | B2 | 10/2006 | Zhang |
| 7,256,711 | B2 | 8/2007 | Sheha et al. |
| 7,339,211 | B2 | 3/2008 | Kim et al. |
| 7,445,782 | B2 | 11/2008 | Fairbrother et al. |
| 7,516,214 | B2 * | 4/2009 | Gandhi ............. G06F 16/90344 709/224 |
| 7,558,884 | B2 | 7/2009 | Fuller et al. |
| 7,577,771 | B2 | 8/2009 | Steeb et al. |
| 7,737,868 | B2 | 6/2010 | Sheha et al. |
| 7,880,880 | B2 | 2/2011 | Van Bilsen et al. |
| 7,903,001 | B2 | 3/2011 | Sheha et al. |
| 8,139,217 | B2 | 3/2012 | Van Bilsen et al. |
| 8,169,343 | B2 | 5/2012 | Sheha et al. |
| 8,240,129 | B2 | 8/2012 | Yezerets et al. |
| 8,390,480 | B2 | 3/2013 | Sheha et al. |
| 8,724,022 | B2 | 5/2014 | Subedar et al. |
| 8,786,469 | B2 | 7/2014 | Sheha et al. |
| 9,062,250 | B2 | 6/2015 | Ito et al. |
| 9,102,869 | B2 | 8/2015 | Furusato et al. |
| 9,217,651 | B2 | 12/2015 | Sheha et al. |
| 9,307,365 | B2 | 4/2016 | Sheha et al. |
| 9,443,275 | B1 | 9/2016 | O'Gwynn |
| 9,466,089 | B2 | 10/2016 | Lu |
| 9,686,012 | B2 | 6/2017 | Inoue |
| 9,686,393 | B1 | 6/2017 | Cai et al. |
| 2010/0297946 | A1* | 11/2010 | Alameh .............. H04M 1/7253 455/41.3 |
| 2014/0325220 | A1* | 10/2014 | Tunnell .................. G06F 21/00 713/168 |
| 2018/0091304 | A1* | 3/2018 | Brook ................ G06K 7/10762 |

OTHER PUBLICATIONS

Leung, J., "Aligning RFID Applications with Supply Chain Strategies," Information & Management, 51 (2014) 260-269.

Leung, J., "Design Research Guidelines for Mindful IT Innovations: The Case of RFID Innovation in Supply Chain Management," Proceedings of Hawaii International Conference on System Sciences 2013, Maui, 10 pages.

Xue, et al., "Computational Experiment-based Evaluation on Context-aware O2O Service Recommendation, to appear IEEE Transactions on Services Computing," 2017.

Chen, et al., "The impact of power structure on the retail service supply chain with an O2O mixed channel," J Oper Res Soc (2016) 67:294.

Rampell, A., "Why Online2Offline Commerce Is A Trillion Dollar Opportunity," http://techcrunch.com/2010/08/07/why-online2offline-commerce-is-a-trillion-dollar-opportunity/. Accessed on Aug. 28, 2018.

Tsai, et al, "An O2O Commerce Service Framework and its Effectiveness Analysis with Application to Proximity Commerce," Procedia Manufacturing 3, 2015, pp. 3489-3505.

Phang, et al., "Leveraging O2O Commerce for Product Promotion: An Empirical Investigation in Mainland China," IEEE Transactions on Engineering Management, 61 (4), Nov. 2014, pp. 623-632.

Xu, et al., "Analysis of the Operating Mechanism of O2O Business Model in the Retail Industry Under the Internet Plus Era," Proceedings 3rd International Conference on Economics and Management (ICEM), Jul. 2016, Suzhou, pp. 130-134.

Liu, et al., "Cultural Tourism O2O Business Model Innovation-Case Analysis Based on CTRIP," Proceedings International Conference on Logistics, Informatics and Service Sciences (LISS), Jul. 2015.

Xiao, et al., "Hidden semi-Markov model-based reputation management system for online to offline (O2O) e-commerce markets," Decision Support Systems, 77, Sep. 2015, pp. 87-99.

Huang, et al., "Boundary permeability and online-offline hybrid organization: A case study of Suning, China," Information & Management, 54, Apr. 2017, pp. 304-316.

He, et al., "Evolutionary location and pricing strategies for service merchants in competitive O2O markets," European Journal of Operational Research, 254 (2016), pp. 595-609.

Lee, J-Y., Kim, Y-H., & Yoon, Y. 2016. An NFC-based O2O service model in exhibition-space, Proceedings 18th International Conference on Electronic Commerce, August, Suwon (Korea), Article No. 42.

Kawaguchi, et al., "Wi-Fi Human Behavior Analysis and BLE Tag Localization: A Case Study at an Underground Shopping Mall," Proceedings 13th International Conference on Mobile and Ubiquitous Systems, Nov. 28-Dec. 1, 2016, Hiroshima, Japan, pp. 151-159.

Kim, et al., "O2O Trend & Future: Focused on Difference from Each Case," Journal of Marketing Thought, 2017, 3 (4), pp. 49-66.

She, et al., "Conflict-Aware Event-Participant Arrangement and Its Variant for Online Setting," IEEE Transactions on Knowledge and Data Engineering, 2016, 28 (9), pp. 2281-2295.

\* cited by examiner

T1

Online interaction 106

T2

Follow-on offline interaction 110

SYSTEM AND METHOD FOR PEER-TO-PEER WIRELESS COMMUNICATION

BACKGROUND

The advance of network technologies enables more human interactions over the network, which not only brings people closer together but also provides them with better access to information, goods, and services. For example, social media platforms can provide a venue for parties (e.g., persons, a group of people, organizations, etc.) from different locales to meet each other and to interact with each other over the network. As another example, virtual clinics allow patients to interact with remote physicians over the network for medical diagnosis. As yet another example, e-commerce platforms allow parties to engage in transactions for different kinds of goods, services, etc., over the network. Backed by ever-increasing network bandwidth and processing power, these network platforms can provide access (e.g., to friends, information, goods, services, etc.) to an ever-increasing population of network users.

Many of these "online" interactions, which occur over the network platforms (e.g., when the parties are in an online state with respect to the network platforms), may create follow-on "offline" interactions that do not involve the network platforms (e.g., the parties are in an offline state with respect to the network platforms). For example, people who make friends using a social media platform may want to meet each other in person, or in other platforms or contexts, to reinforce their friendship. A patient who interacts with a remote physician may want to visit the physician in person for a more detailed checkup. A buyer of merchandize or a service may also want to receive the merchandize or service from the seller (or the seller's representative) in person.

To ensure security, it may be necessary for the parties of the follow-on offline interactions to exchange certain information to authenticate each other, and to verify that the parties are authorized for the follow-on offline interactions. Moreover, to protect the privacy of each party, and to minimize the risk of exposing sensitive information to imposters, it may be necessary to minimize the scope of the information exchanged between the parties for authentication and authorization of the follow-on offline interactions.

BRIEF SUMMARY

To provide better security and privacy for human interactions, including offline interactions that originate from prior online interactions, embodiments can establish a peer-to-peer wireless communication channel between two parties to authenticate two parties to a prospective offline interaction. The peer-to-peer wireless communication channel can exchange security information to confirm that the two parties are authorized to engage in that prospective offline interaction. Upon confirming the two authenticated parties are authorized for the offline interaction, one or more actions can be performed to facilitate the prospective interaction. The prospective interaction can be a follow-on offline interaction for a prior online interaction between the two parties over a network platform and may include, for example, an in-person interaction, subsequent exchange of electronic information using the peer-to-peer wireless communication channel, etc.

To authenticate two parties, two mobile devices associated with respectively each of the two parties may broadcast a pairing code and listen for another pairing code assigned to the other device and/or party. Both devices may have received the pairing codes from the network platform during the prior network interaction to authenticate the other device and/or party for the follow-on interaction. After each device receives a matching pairing code and authenticates the other device, the two devices can establish a peer-to-peer wireless communication channel.

Using the established peer-to-peer wireless communication channel, the two devices can exchange security information, such as handshake codes, to confirm that the two parties are authorized to engage in the prospective offline interaction. Both devices may also have received the handshake codes from the network platform during the prior online interaction. For example, during the prior online interaction, each party may have provided a handshake code to the network platform for the follow-on offline interaction, and the network platform may transmit the received handshake codes to the other party. Each device can determine that the other device is associated with (and/or operated by) an authorized party based on receiving, via the established peer-to-peer wireless communication channel, the handshake code the device (and/or the party associated with the device) previously provided to the network platform.

Upon confirming that the two parties are authorized, the devices may take various actions to facilitate the follow-on interactions including, for example, generating an indication to each party that the follow-on interaction (e.g., an in-person interaction) may proceed, maintaining the peer-to-peer wireless communication channel (which may otherwise be discontinued if the devices cannot confirm that parties are authorized) to allow exchange of addition electronic information between the two parties, etc.

Other embodiments are directed to systems, portable consumer devices, and computer readable media associated with methods described herein.

A better understanding of the nature and advantages of embodiments of the present disclosure may be gained with reference to the following detailed description and the accompanying drawings.

DETAILED DESCRIPTION

Figure 1:
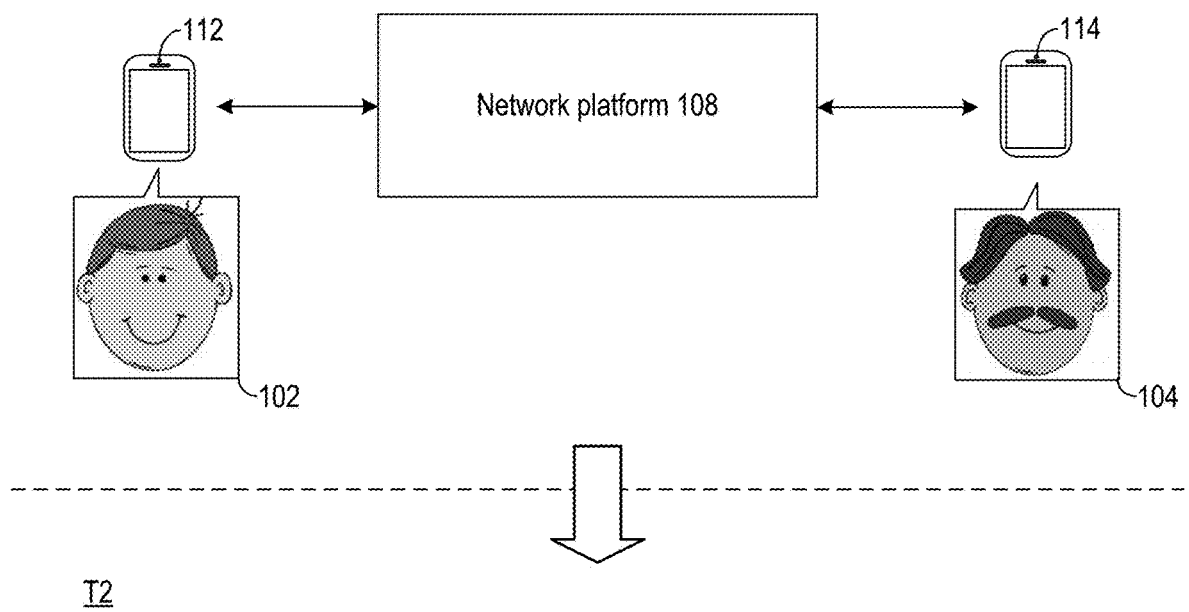
FIG. 1 is an example of an online interaction and its follow-on offline interaction according to embodiments of the present disclosure.
Figure 1:
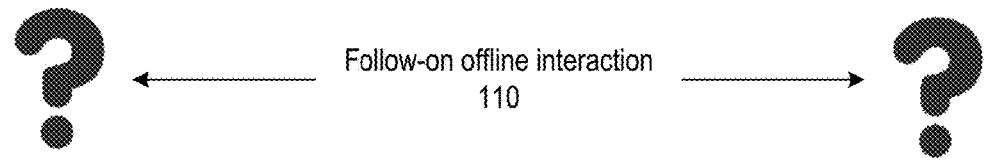

Embodiments of the present disclosure can enable initiating an offline interaction that originates from a prior online interaction. For example, in a first phase, two mobile devices associated with two parties to a prospective offline interaction can initiate a pairing process to establish a wireless peer-to-peer communication channel. The pairing process can be based on unique pairing codes associated with the prospective offline interaction and/or the mobile devices, which allows the parties to authenticate each other for the prospective offline interaction. Successful authentication can lead to a second phase, in which the devices can perform a handshake operation to exchange security information (e.g., handshake codes) to confirm that the authenticated parties are authorized for the prospective offline interaction. Upon confirming that the parties are authorized, the offline interaction between the two parties may then proceed.

Embodiments can improve the security of an offline interaction. For example, two parties can determine to proceed with an offline interaction after authenticating each other, and after determining that both parties are authorized to engage in the offline interaction. Such arrangements can improve security by allowing only the authenticated and authorized parties to engage in an offline interaction, and by allowing both parties to confirm that the prospective offline interaction is a pre-determined follow-on interaction from the prior online interaction before proceeding. The security can be further improved by requiring the parties to receive the necessary security information for authentication and authorization (e.g., the pairing codes, the handshake codes, etc.) from the network platforms during the prior online interactions, when the parties are also authenticated and authorized by the network platforms in order to receive the security information. Given that the two parties must navigate through multiple authentication and authorization processes to engage in the offline interaction, the risk of a party being misled into engaging the offline interaction with an imposter can be mitigated.

Embodiments can also enhance the privacy of the parties to the offline interaction. For example, the security information exchanged between the parties (e.g., the pairing codes and the handshake codes) can be made to be unique and independent from other interactions (whether the interactions are transacted in the same or different network platforms), in order not to reveal sensitive personal information of the parties (e.g., the real name of the parties, the user names of the parties on the network platforms, etc.). The security information can also be configured to expire upon completion of the offline interaction. Neither party needs to provide personal information (or other credential information) for the authentication and authorization processes, which can reduce the likelihood of leaking the parties' sensitive personal information in case the security information is intercepted by other parties when exchanged in the peer-to-peer communication channel.

Embodiments can also improve the efficiency of performing the authentication and authorization processes. As described above, the authentication and authorization processes can be performed between two mobile devices via a peer-to-peer wireless communication channel, and the two parties need not access the network platforms (which hosted the prior online interactions) again for the offline interactions. Such arrangements can reduce the accesses to the network platforms as well as the associated network traffic and latency. Moreover, the authentication and authorization processes (e.g., the pairing process, the establishment of the peer-to-peer communication channel, the exchange of handshake codes over the channel, etc.) can be performed automatically with or without additional inputs from the parties, which can further simplify and speed up the authentication and authorization processes and improve user experience.

I. Online and Offline Interactions

Two parties can engage in an online interaction via a network platform, and determine to have a follow-on interaction after the conclusion of the online interaction at a pre-determined time and/or at a pre-determined location (e.g., for in-person follow-on interactions). The two parties may receive, during the online interaction, security information for authenticating and authorizing each party to engage in the follow-on interaction. The security information can be stored in the mobile devices (e.g., phones, tablets, laptops, watches, etc.) associated and/or operated by the two parties, and the mobile devices can perform the authentication and authorization processes at the pre-determined time and location of the follow-on interaction.

FIG. 1 is a chart illustrating an online interaction and its follow-on offline interaction according to embodiments of the present disclosure. In the example of FIG. 1, within a time period T1, a party 102 and a party 104 may engage in an online interaction 106 over a network platform 108 using their respective mobile devices 112 and 114. In some examples, network platform 108 may be a web application hosted on a web server and can provide various kinds of online interactions. For example, network platform 108 can be a social media platform which allows parties 102 and 104 to post messages, media data, comments, etc., and online interaction 106 may comprise, for example, party 102 browsing messages, media data, comments, etc. posted by party 104 (or vice versa), party 102 and party 104 engaging in real-time messaging or participating in a chat room hosted by network platform 108, etc.

In some examples, network platform 108 can also host a virtual clinic which allows a patient (e.g., party 102) to receive a medical diagnosis from a remote physician (e.g., party 104) over network platform 108, and online interaction 106 may comprise, for example, a real-time virtual medical diagnosis session, exchange of information between the patient and the physician, etc. The exchange information can be via, for example, real-time messaging, emails, posting of messages in a portal of the virtual clinic, etc. In some examples, network platform 108 can also include an e-commerce platform to allow parties 102 and 104 to engage in transactions for different kinds of goods, services, etc., over the network, and online interaction 106 may include, for the example, the transactions between parties 102 and 104, or exchange of other information between the two parties.

As part of online interaction 106, parties 102 and 104 may also determine to have a follow-on offline interaction 110 at time period T2 after T1. Follow-on offline interaction 110 may be an offline interaction that is not hosted by network platform 108 and is "offline" with respect to network platform 108. For example, parties 102 and 104 may schedule, at network platform 108, an in-person meeting or interactions via other network platforms following exchange of messages, media data, comments, etc. at network platform 108. As another example, parties 102 and 104 may schedule, at network platform 108, a follow-up in-person medical diagnosis session for party 102 at the medical office of party 104. Further, parties 102 and 104 may also schedule, at network platform 108, a meeting to receive goods, services, etc.

There may be a need to authenticate and authorize parties 102 and 104 before offline interaction 110 to take place to improve the security. For example, parties 102 and 104 may not know each other personally, and their knowledge of each other may be purely based on the prior online interaction 106. Therefore, before party 104 is committed to engage in offline interaction 110 with a party proclaimed to be party 102, party 104 may wish to authenticate that party to ascertain that that party is really party 102, not an imposter. Moreover, upon confirming that the other party is party 102, party 104 may wish to confirm that the requested offline interaction was pre-arranged between the two parties in a prior online interaction, such that both parties have been authorized (e.g., by each other party and/or by a third party such as network platform 108) to engage in offline interaction 110 at time period T2. For example, party 104 may have pre-arranged multiple offline interactions with party 102 at different time periods, and may wish to confirm that the requested offline interaction is what the two parties have scheduled at time period T2.

II. Systems for Online and Follow-on Interactions

A. Network Platform

Figure 2A:
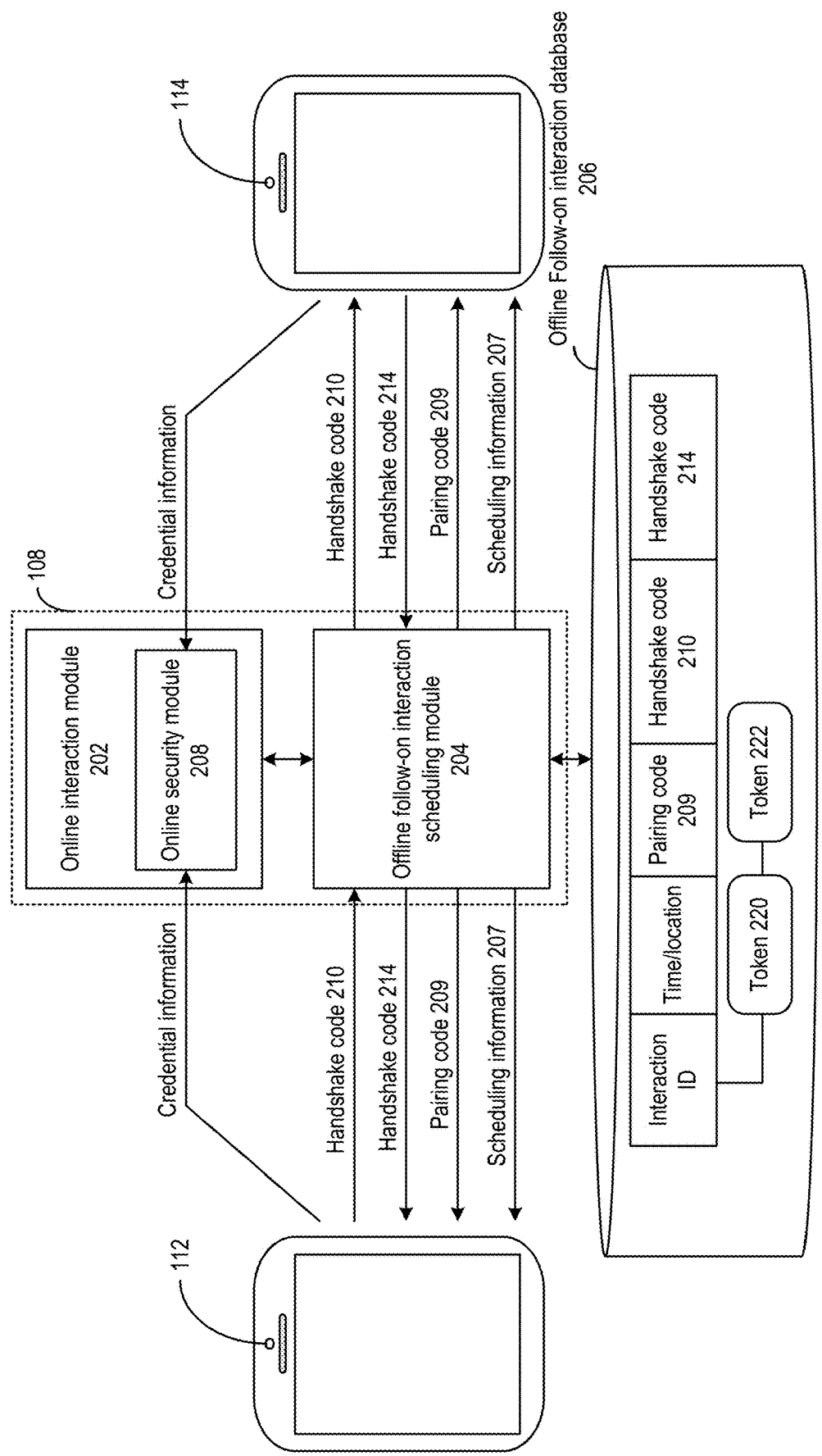
FIG. 2A, FIG. 2B and FIG. 2C illustrate block diagrams of components involved in the online interaction and the offline interaction of FIG. 1 according to embodiments of the present disclosure.

FIG. 2A illustrates an example of a block diagram of network platform 108 according to embodiments of the present disclosure. In the example of FIG. 2A, network platform 108 may include an online interaction module 202 and an offline follow-on interaction scheduling module 204. Network platform 108 may also couple with an offline follow-on interaction database 206. In some examples, network platform 108 can be a web server hosted on a server accessible by mobile devices 112 and 114.

Online interaction module 202 may provide a platform for conducting various online interactions described above (e.g., posting and browsing of messages, media data, comments, transactions, etc.) between mobile devices 112 and 114. Online interaction module 202 further includes an online security module 208, which maintains a set of user accounts. A user may need to create an account in order to use online interaction module 202. Each account may store (or be associated with) credential information, such as a password and a virtual identifier (e.g., a nickname, an alias, etc.), which a user needs to provide in order to log into an account to use online interaction module 202 for online interactions.

Offline follow-on interaction scheduling module 204 may allow two parties of an online interaction (conducted via online interaction module 202) to schedule a follow-on interaction for that online interaction. The scheduling may include providing a time, a location, the parties, an attribute of the interaction (e.g., whether the interaction is an offline interaction not hosted by online interaction module 202), and security information for authenticating and authorizing the parties prior to the scheduled follow-on interaction, the details of which are to be described in detail below. Each scheduled follow-on interaction may be associated with an interaction identifier, the virtual identifiers of the users who are designated as the parties to the follow-on interaction, the scheduled time and location of the follow-on interaction, as well as the security information. These items of information (e.g., the interaction identifier, the virtual identifiers of the users, the scheduled time and location of the follow-on interaction, etc.) can be stored at offline follow-on interaction database 206 upon the follow-on interactions being scheduled. Offline follow-on interaction scheduling module 204 also transmits the scheduling information (e.g., time and location of the follow-on interactions) as well as the security information to mobile devices 112 and 114, as to be described with more details below.

In some examples, offline follow-on interaction scheduling module 204 may be triggered by online interaction module 202 based on a state of an online interaction between the two parties. For example, in a case where online interaction module 202 provides an instant messaging service to parties 102 and 104, online interaction module 202 can detect, by performing text analysis on the messages in an instant messaging session, that the two parties of the session are interested to meet up in person, and can trigger offline follow-on interaction scheduling module 204 to prompt the two parties to schedule a follow-on in-person meeting. As another example, in a case where online interaction module 202 provides a platform for party 102 to purchase an item from party 104, online interaction module 202 may, upon detecting that party 102 has made an online payment, prompt the two parties to schedule a follow-on meeting for party 104 (or a representative of party 104) to deliver the purchased item to party 102. In some examples, offline follow-on interaction scheduling module 204 may also be triggered by the two parties manually at any time when the parties log into their accounts and use online interaction module 202.

As part of the scheduling for the follow-on interaction, offline follow-on interaction scheduling module 204 may generate and/or obtain security information for authenticating and authorizing the parties prior to the scheduled follow-on interaction. The security information may include a pairing code 209 and a pair of handshake codes 210 and 214. The pairing code 209 can be provided to parties 102 and 104 and can be stored at mobile devices 112 and 114, whereas each party may receive one of the pair of handshake codes and store the handshake code at the associated mobile device.

Pairing code 209 can be used in a pairing process to establish a peer-to-peer communication channel between mobile device 112 and 114 prior to a scheduled follow-on interaction between parties 102 and 104. In some examples, pairing code 209 can be generated by offline follow-on interaction scheduling module 204 based on, for example, an interaction identifier associated with the scheduled interaction. The pairing process can be used to authenticate mobile devices 112 and 114 (and parties 102 and 104 associated with the mobile devices). This is because parties 102 and 104 receive pairing code 209 only when they log into online interaction module 202 and schedule the follow-on meeting. Therefore, parties in possession of pairing code 209 are more likely to have been authenticated by, for example, online security module 208. As part of the authentication process, mobile device 112 may determine, based on mobile device 114 providing a valid pairing code (e.g., pairing code 209), that mobile device 114 is associated with party 104 to the follow-on meeting or, at the very least, that mobile device 114 is associated with a trusted party (instead of an imposter who may not have access to the pairing code). The two mobile devices can then be paired to establish a peer-to-peer communication channel for subsequent exchange of handshake code to be described below.

Following the establishment of a wireless peer-to-peer communication channel between two authenticated mobile devices (and parties), handshake codes can be exchanged between the two parties via the wireless peer-to-peer communication channel. Each party (e.g., party 102) may compare the received handshake code (received from party 104) with a reference handshake code to determine that the other party is authorized for the prospective follow-on interaction. The received handshake codes may be generated based on confirmation of the scheduled time and date for the prospective follow-on interaction, and can be sent by a party to show that the party is authorized for the follow-on interaction.

In some examples, each party may use the associated mobile device to create a handshake code, and then exchange the handshake code via offline follow-on interaction scheduling module 204. Each mobile device may then store a handshake code created by the other party. At the time of the follow-on interaction and after the wireless peer-to-peer communication channel has been established, the mobile devices can exchange the handshake codes (provided by the operating parties) over the wireless peer-to-peer communication channel. Each mobile device can then compare the received handshake code (from the other mobile device and provided by the party operating that mobile device) versus the reference handshake code previously sent by the mobile device (and/or the party associated with the device) to offline follow-on interaction scheduling module 204.

If both mobile devices receive a matching handshake code over the wireless peer-to-peer communication channel, it can be determined that the parties of the mobile devices are authorized for the follow-on interaction. As to be described in more detail below, to further enhance security, the handshake codes can be encrypted by the mobile devices, and the mobile devices can exchange the encrypted handshake codes via offline follow-on interaction scheduling module 204 (during online interaction) and via the wireless peer-to-peer communication channel (prior to the follow-on interaction).

In FIG. 2A, party 102 may send, via offline follow-on interaction scheduling module 204, an invitation to party 104 for a follow-on interaction. Party 102 may create a handshake code 210 using mobile device 112, and include handshake code 210 in the invitation. Offline follow-on interaction scheduling module 204 can forward the invitation together with handshake code 210 to party 104. Optionally, mobile device 112 may also store handshake code 210 and associate handshake code 210 with the scheduled follow-on interaction (e.g., via an interaction identifier).

Party 104 may also create a handshake code 214 using mobile device 114 (and optionally store handshake code 214 at mobile device 114), and send handshake code 214 together with an acceptance response to offline follow-on interaction scheduling module 204, which then forwards the acceptance response as well as handshake code 214 to mobile device 112. In some examples, offline follow-on interaction scheduling module 204 can also store handshake codes 210 and 214 at offline follow-on interaction database 206 by associating the handshake codes with an interaction identifier of the follow-on interaction, user identifiers of users who are designated as the parties to the follow-on interaction (not shown in FIG. 2A), the scheduled time and location of the follow-on interaction, the pairing code, etc.

In some examples, follow-on interaction scheduling module 204 can create a data package, in the form of a token, to include a pairing code, a handshake code, as well as other information related to a scheduled follow-on meeting, and transmit the token to a party of the scheduled follow-on meeting. In FIG. 2A, follow-on interaction scheduling module 204 may create a token 220 for party 102 including pairing code 209, handshake code 214, and scheduling information 207, and a token 222 for party 104 including pairing code 209, handshake code 210, and scheduling information 207. Follow-on interaction scheduling module 204 may store tokens 220 and 222 at offline follow-on interaction database 206 and transmit tokens 220 and 222 to, respectively, mobile devices 112 and 114 when the mobile devices are available to receive the tokens.

B. Mobile Device

Figure 2B:
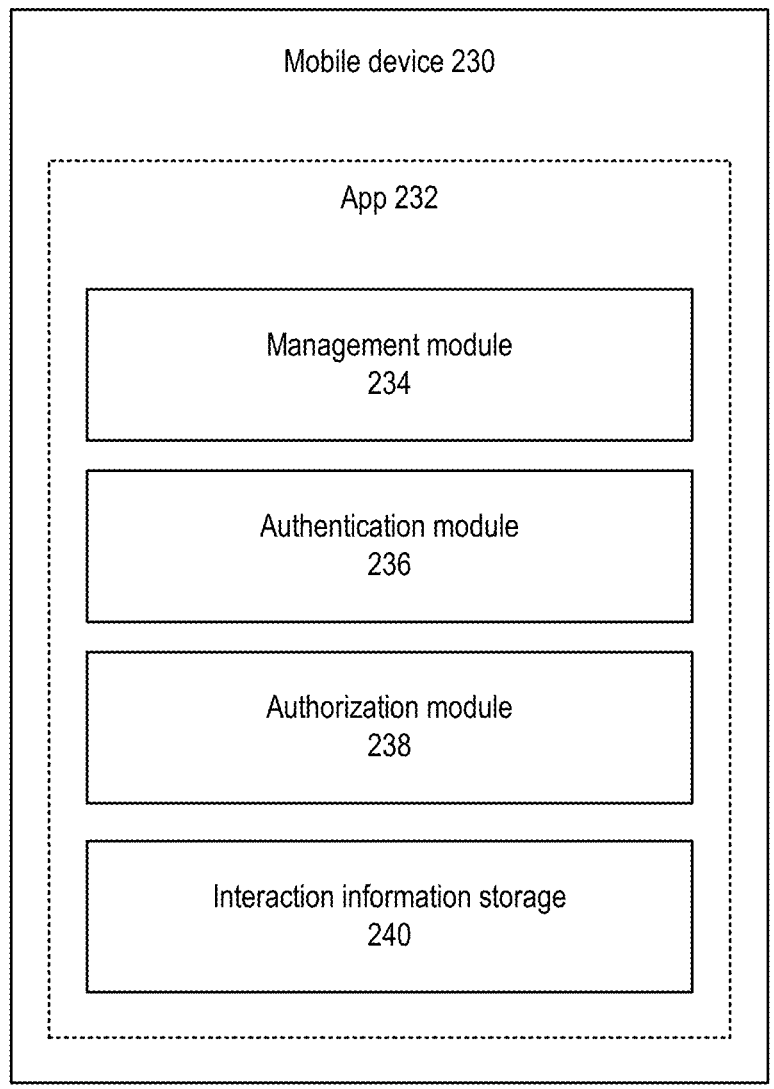

FIG. 2B illustrates examples of software components of a mobile device 230 capable of facilitating follow-on interactions according to embodiments of the present disclosure. Mobile device 230 may include, for example, one of mobile device 112 or mobile device 114 and is capable of communicating with network platform 108. As shown in FIG. 2B, mobile device 230 may include an app 232 to facilitate follow-on interactions involving the party associated with mobile device 230. The follow-on interactions may include offline interactions that are not hosted by network platform 108, and may include in-person interactions. App 232 can interface with other components of mobile device 230 (not shown in FIG. 2B) to facilitate the follow-on interactions. For example, app 232 may interface with a local clock, a location sensor, a wireless transceiver at mobile device 230, etc., to perform one or more operations for facilitating the follow-on interactions. In the example of FIG. 2B, app 232 may include a management module 234, an authentication module 236, an authorization module 238, and interaction information storage 240.

Management module 234 can perform one or more operations to assist a user of mobile device 230 in managing the scheduled follow-on interactions the user has scheduled via offline follow-on interaction scheduling module 204. The operations may include, for example, generating a notification for outputting at mobile device 230 to remind a user of an upcoming follow-on interaction. The generation of the notification can be based on the scheduling information of the follow-on interaction (e.g., extracted from the tokens received from offline follow-on interaction scheduling module 204), as well as a current time and location of mobile device 230 (e.g., obtained from local timer and location sensors). The operations may also include, for example, periodically transmitting requests to offline follow-on interaction scheduling module 204 for updated tokens for the scheduled follow-on interactions to obtain updated information (e.g., updated scheduling information, updated security information for authentication and/or authorization, etc.). Upon receiving a token (original or updated) for a follow-on interaction, management module 234 may extract the pairing code, the handshake code, the time and location information, etc., associate the information with an interaction identifier, and store the information with the interaction identifier at interaction information storage 240.

Authentication module 236 can perform one or more operations to authenticate another party who seeks to engage in a follow-on interaction with the user of mobile device 230. Authentication module 236 can operate with the wireless transceivers of mobile device 230 to initiate a pairing process to establish a peer-to-peer communication channel with another mobile device associated with the other party. The pairing process can be based on a pairing code (e.g., pairing code 209) stored in interaction information storage 240 for the follow-on interaction. Upon successful pairing, authentication module 236 may determine that the other mobile device is in possession of a valid pairing code and is authenticated.

There are various ways by which authentication module 236 can use the pairing code to authenticate the other mobile device and the associated party. In some examples, authentication module 236 can broadcast a message including a pairing code and, upon receiving a response message including the same pairing code from another mobile device, can pair with the other mobile device to establish the wireless peer-to-peer communication channel. In some examples, instead of broadcasting the entirety of the handshake code, authentication module 236 can broadcast a portion of it (e.g., a first half of the pairing code) in the broadcast message, and monitor for a response from another mobile device which includes another portion of the pairing code (e.g., a second half of the pairing code). Upon receiving part of pairing code from the response, authentication module 236 can combine the portions of the pairing code to determine whether the combination matches the original pairing code. If they match, authentication module 236 can also determine that the other mobile device is authenticated for the follow-on meeting. In some examples, as to be described below, the pairing process may be based on a wireless protocol including, for example, Bluetooth® (e.g., BTLE)

Authorization module 238 can perform one or more operations to confirm that another party who seeks to engage in a follow-on interaction with the user of mobile device 230 is authorized for the follow-on interaction. Authentication module 236 can operate with the wireless transceivers of mobile device 230 to exchange handshake codes (extracted from the tokens) with the other mobile device via the wireless peer-to-peer communication channel established by authentication module 236. For example, in FIG. 2A, as part of the scheduling of a follow-on interaction, mobile device 230 (represented by mobile device 112 in FIG. 2A) may receive a token from mobile device 114 that includes handshake code 214. At the time of the follow-on interaction, mobile device 230 may receive a handshake code from a party via mobile device 114 via the wireless peer-to-peer communication channel. The authorization module 238 of mobile device 230 can compare the received handshake against a reference copy of handshake code 214. If they match, mobile device 230 may determine that the party of mobile device 114 is authorized to engage in the follow-on interaction with the party of mobile device 230. The same authorization process also takes place at the authorization module 238 of mobile device 114 to determine whether handshake code 210 is received from mobile device 230.

In some examples, as described above, the mobile devices of the two parties can exchange encrypted handshake codes over network platform 108 as part of the scheduling of the follow-on interaction, and exchange (again) the previously-exchanged handshake codes over the wireless peer-to-peer communication channel as part of the authorization process. The encryption can reduce the likelihood that an unauthorized mobile device can intercept the handshake code and use the handshake code to falsify the authorization. The encryption (and optional decryption) of the handshake codes can be performed by authorization module 238.

C. Encryption Process

Figure 2C:
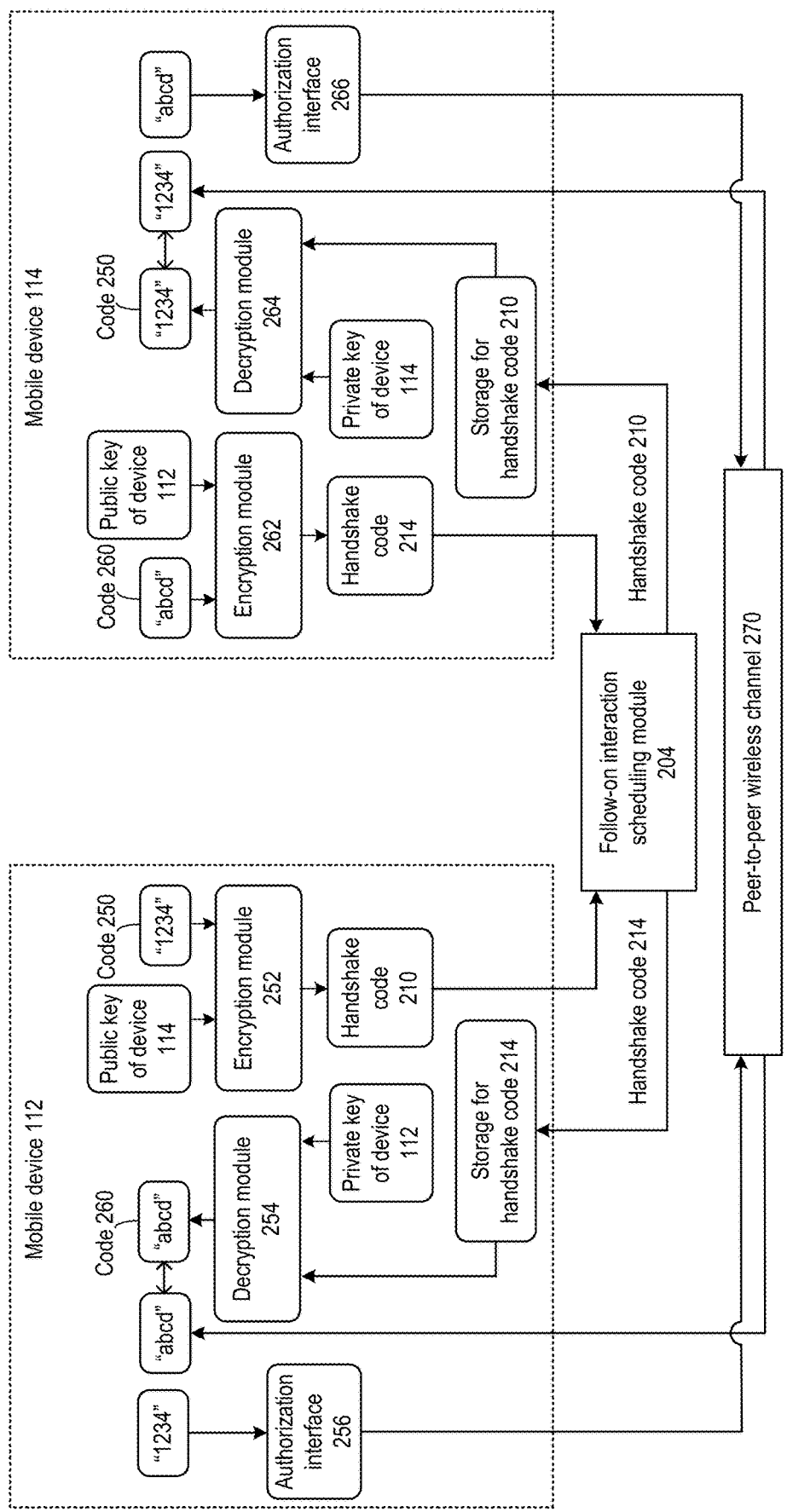

FIG. 2C illustrates an example of an asymmetric cryptography encryption process. In FIG. 2C, the authorization module 238 of mobile device 112 (which is operated by and/or associated with party 102) can obtain a code 250 (e.g., "1234" in FIG. 2C). As examples, code 250 can be provided by party 102, from network platform 108, by a trusted third-party, etc. Code 250 can also be locally generated by mobile device 112 using any suitable algorithms (e.g., based on a random function, based on the interaction identifier, etc.). The authorization module 238 of mobile device 112 may include an encryption module 252, which can encrypt code 250 with a public key of mobile device 114 using, for example, asymmetric cryptography to generate handshake code 210 (representing "1234" in FIG. 2C), which is encrypted. For example, code 250 can be generated based on an International Mobile Equipment Identity (IMEI) number of mobile device 112. Handshake code 210 can be decrypted only with a private key of mobile device 114. The private key of mobile device 114 can be stored in mobile device 114.

Similarly, the authorization module 238 of mobile device 114 can obtain a code 260 (e.g., "abcd" in FIG. 2C) and encrypt, using an encryption module 262, code 260 with a public key of mobile device 112 to generate encrypted handshake code 214 (representing "abcd" in FIG. 2C). Handshake code 214 can be decrypted only with a private key of mobile device 112. The private key of mobile device 112 can also be stored in mobile device 112.

The handshake codes can be exchanged twice between mobile devices 112 and 114. As shown in FIG. 2C, as part of the scheduling of a follow-on interaction, mobile device 112 can transmit handshake code 210 (which is encrypted) to mobile device 114 via offline follow-on interaction scheduling module 204. The handshake code 210 can be stored in, for example, a storage in mobile device 114, or other storages accessible to mobile device 114, together with pairing code 209 as part of token 220. Moreover, mobile device 114 can transmit handshake code 214 (which is encrypted) to mobile device 112 also via offline follow-on interaction scheduling module 204. The handshake code 214 can also be stored in a storage in mobile device 112 or other storages accessible to mobile device 112, together with pairing code 209 as part of token 222.

At a time prior to the scheduled follow-on interaction and after a wireless peer-to-peer communication channel 270 has been established between mobile devices 112 and 114, an authorization process can take place to determine whether each of the mobile devices is operated by an authorized party. As shown in FIG. 2C, as part of the authorization process, mobile devices 112 and 114 can provide, respectively, authorization interface 256 and authorization interface 266 to parties 102 and 104 to re-enter their handshake codes. For example, party 102 (not shown in FIG. 2C) may re-enter original code 250 ("1234" in FIG. 2C) or some other codes through authorization interface 256, which then transmits the code via peer-to-peer wireless channel 270 to mobile device 114. The authorization module 238 of mobile device 114 can also obtain the handshake code 210 (representing "1234" in FIG. 2C) from the storage, and use a decryption module 264 to decrypt the code using a private key of mobile device 114 to recover code 250. If the recovered code 250 matches the original code 250 ("1234") received over peer-to-peer wireless channel 270, the authorization module 238 of mobile device 114 may determine that the operator of mobile device 112 (party 102 in the example of FIG. 2C) is authorized for the follow-on interaction.

Similarly, as part of the authorization process, party 104 (not shown in FIG. 2C) may re-enter original code 260 ("abcd" in FIG. 2C) or some other codes through authorization interface 266, which then transmits the code via peer-to-peer wireless channel 270 to mobile device 112. The authorization module 238 of mobile device 112 can also obtain the handshake code 214 (representing 'abed' in FIG. 2C) from the storage, and use a decryption module 254 to decrypt the code using a private key of mobile device 112 to recover code 260. If the recovered code 260 matches the original code 260 ("abcd") received over peer-to-peer wireless channel 270, the authorization module 238 of mobile device 112 may also determine that the operator of mobile device 114 (party 104 in the example of FIG. 2C) is authorized for the follow-on interaction. If the authorization module 238 of both mobile devices determines that the operators of the respective mobile devices are authorized for the follow-on interaction, the mobile devices can then perform one or more actions to facilitate the follow-on interaction. The one or more actions may include, for example, generating an indication to each party that the follow-on interaction (e.g., an in-person interaction) may proceed, maintaining the peer-to-peer wireless communication channel (which may otherwise be discontinued if the devices cannot confirm that parties are authorized) to allow exchange of addition electronic information between the two parties, etc.

In some examples, instead of relying on the operating parties to re-enter the handshake codes, the mobile device can also transmit the handshake codes on behalf of the operating parties over peer-to-peer wireless channel 270. For example, the authorization module 238 of mobile device 112 may transmit handshake code 214 (received from offline follow-on interaction scheduling module 204) via peer-to-peer wireless channel 270 to mobile device 114. In these examples, handshake code 214 can be encrypted using the public key of mobile device 114. The authorization module 238 of mobile device 114, upon receiving the handshake code 214 from mobile device 112 via peer-to-peer wireless channel 270, can decrypt the received code using a private key of mobile device 114, and determine that party 102 (and mobile device 112) is authorized based on recovering code 260 from the decryption. Similarly, the authorization module 238 of mobile device 114 may transmit handshake code 210 (received from offline follow-on interaction scheduling module 204) via peer-to-peer wireless channel 270 to mobile device 112. Handshake code 210 can be encrypted using the public key of mobile device 112. The authorization module 238 of mobile device 112, upon receiving the handshake code 210 from mobile device 114 via peer-to-peer wireless channel 270, can decrypt the received code using a private key of mobile device 112, and determine that party 104 (and mobile device 114) is authorized based on recovering code 250 from the decryption.

There are different ways by which mobile devices 112 and 114 can obtain the public keys and private keys to perform the encryption and decryption processes. For example, network platform 108 (e.g., online security module 208) may generate a public key and a private key for each registered user, including parties 102 and 104, and provide mobile devices 112 and 114 with the public keys and the private keys. The mobile devices can then store the public key and the private keys to perform the encryption and decryption processes.

While FIG. 2C illustrates one method of encrypting the handshake codes, it is understood that other encryption methods can also be used. For example, instead of the asymmetric encryption, mobile devices 112 and 114 can perform a symmetric encryption with both devices encrypting the handshake codes with a shared key between mobile devices 112 and 114. The shared key may be generated using any known algorithms or protocols, such as Diffie-Hellman, Elliptic-curve Diffie-Hellman (ECDH), etc. As another example, the handshake codes can also be encrypted using hash functions.

III. Example Protocol and Signaling

One wireless protocol used can be BT. BT can use short-wavelength ultra-high frequency (UHF) radio waves in the ISM band from 2.4 to 2.485 GHz. Two mobile devices may be equipped with BT transceivers and can perform a pairing process to perform authentication of the parties of an offline interaction according to the BT protocol.

Figure 3:
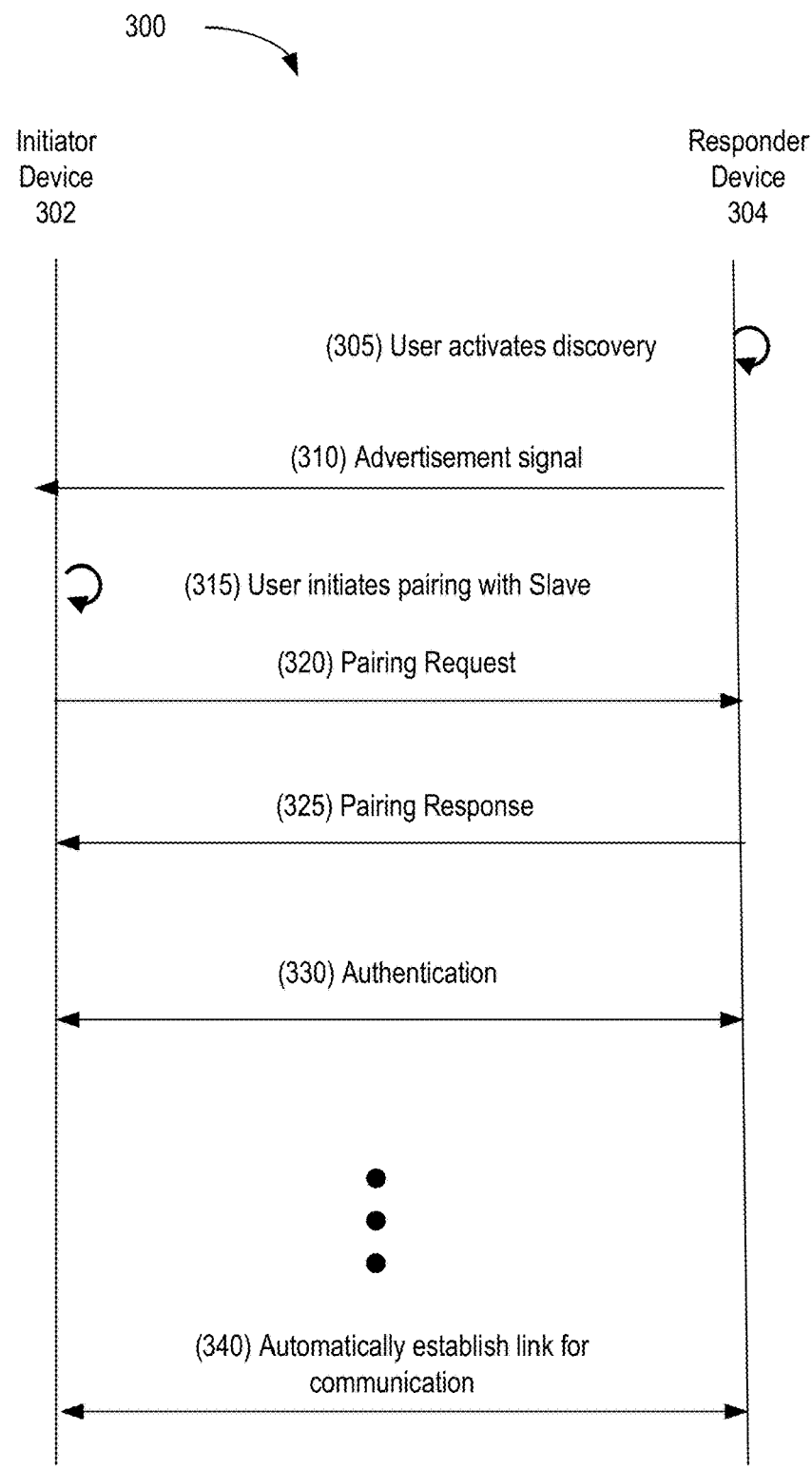
FIG. 3 illustrates an example of a peer-to-peer communication for authenticating and authorizing the parties for a prospective offline interaction according to embodiments of the present disclosure.

FIG. 3 shows a sequence diagram of a pairing process 300 according to embodiments of the present invention. Pairing process 300 involves an initiator device 302 (e.g., mobile device 112) and a responder device 304 (e.g., mobile device 114). Each device determines its capability for input and output (IO).

In step 305, responder device 304 can be set in a discoverable mode. To be found by other Bluetooth devices, a device should be set to discoverable mode so that an advertisement signal is sent. The advertisement signal allows other devices in the vicinity to detect its presence and attempt to establish a connection.

In step 310, responder device 304 emits an advertisement signal in response to the user activation. Initiator device 302 can detect the advertisement signal. For example, initiator device 302 can periodically scan for advertisement signals. Initiator device 302 can be configured to perform such scans and set a scan rate, or a scan rate can be set by default.

The advertisement signal may include information that is uniquely associated with responder device 304, as well as the handshake code information, which initiator device 302 can use to authenticate responder device 304 and the party associated with the device. In some examples, the advertisement signal may include a combination of the universally unique identifier (UUID) of initiator device 302, a pairing code received from network platform 108 (e.g., pairing code 209), and a Bluetooth Media Access Control (MAC) address of initiator device 302.

In step 315, a pairing process can be initiated at initiator device 302. The pairing process can be initiated by management module 234 based on, for example, initiator device 302 being at a location of a scheduled offline interaction, receiving an user input, etc.

In step 320, a Pairing Request message is sent from initiator device 302 to responder device 304. As examples, the Pairing Request message can include IO capabilities of initiator device 302, authentication data availability, authentication requirements, key size requirements, and other data.

In step 325, a Pairing Response message is transmitted from responder device 304 and contains much of the same information as the Pairing Request message.

In step 330, authentication is performed, e.g., based on the pairing code. Authentication can be confirmed by both devices.

In step 340, at a later time, a link for communication is automatically established between the devices. The link can be used to exchange handshake codes for authorization of the parties, as described above.

IV. Method

Figure 4:
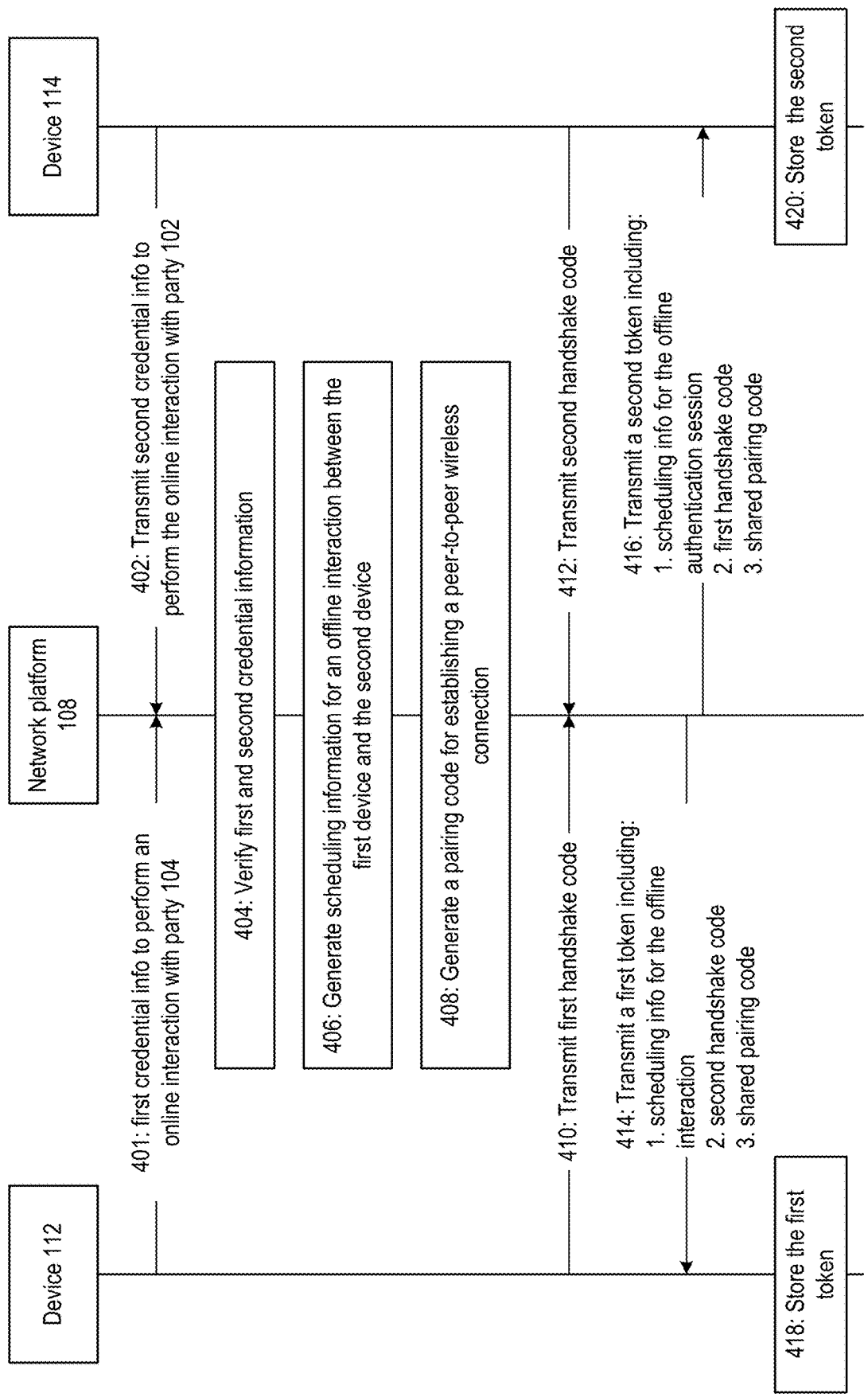
FIG. 4 illustrates an example of a process for performing an online interaction according to embodiments of the present disclosure.
Figure 5:
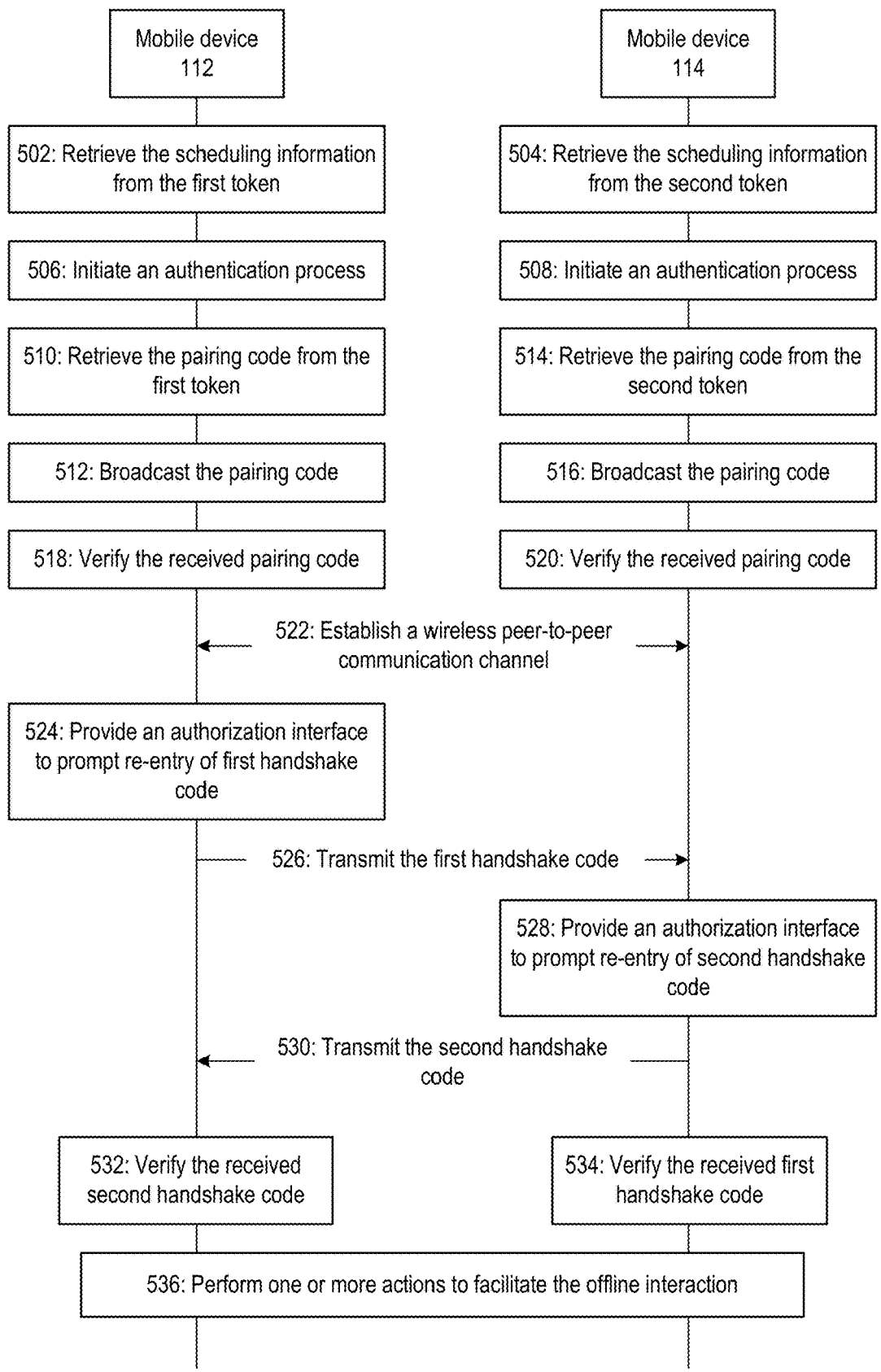
FIG. 5 illustrates an example of a process for initiating an offline interaction according to embodiments of the present disclosure.

FIG. 4 and FIG. 5 are flowcharts that illustrate sequences of operations included to improve the security and privacy of an offline interaction between two parties. The offline interaction may be originated from a prior online interaction between the two parties over a network platform. As part of the online interaction, the two parties may have scheduled the offline interaction and be provided with security information to authenticate and authorize both parties prior to the scheduled offline interaction. FIG. 4 illustrates a sequence of operations of an online interaction involving two mobile devices and a network platform, whereas FIG. 5 illustrates a sequence of operations involving the two mobile devices, and without involving the network platform, to authenticate and authorize the devices and the parties.

FIG. 4 is a flowchart of a method 400 for performing online interaction between two mobile devices (e.g., mobile devices 112 and 114) via a network platform (e.g., network platform 108).

At step 401, mobile device 112 (e.g., of party 102) can transmit first credential information to log into network platform 108 to perform an online interaction with party 104. Party 102 may have opened an account at network platform 108, and the first credential information may be stored in the account of party 102 and may include, for example, a user name associated with the account of party 102, a password associated with the account of party 102, and other suitable information that network platform 108 can use to authenticate party 102.

At step 402, mobile device 114 can transmit second credential information to log into network platform 108 to perform the online interaction with party 102. Similar to party 102, party 104 may have opened an account at network platform 108, and the second credential information may be stored in the account of party 104 and may include, for example, a user name associated with the account of party 104, a password associated with the account of party 104, and other suitable information that network platform 108 can use to authenticate party 104.

At step 404, network platform 108 can verify the first and second credential information to authenticate party 102 and party 104. For example, network platform 108 may compare the first and second credential information with, respectively, credential information (e.g., password, user name, etc.) stored in the accounts of party 102 and of party 104. In some examples, step 404 can be performed by, for example, online security module 208 of FIG. 2A.

At step 406, upon authenticating both of parties 102 and parties 104 and receiving requests from the parties to schedule a follow-on interaction (e.g., an offline meeting not hosted by network platform 108), network platform 108 can initiate the scheduling process. The scheduling may include providing a time, a location, the parties, an attribute of the interaction (e.g., whether the interaction is an offline interaction not hosted by online interaction module 202), and security information for authenticating and authorizing the parties prior to the scheduled follow-on interaction, the details of which are to be described in detail below. Each scheduled follow-on interaction may be associated with an interaction identifier, the virtual identifiers of the users who are designated as the parties to the follow-on interaction, the scheduled time and location of the follow-on interaction, as well as the security information. These items of information can be stored at offline follow-on interaction database 206 upon the follow-on interactions being scheduled. Offline follow-on interaction scheduling module 204 also transmits the scheduling information (e.g., time and location of the follow-on interactions) as well as the security information to mobile devices 112 and 114, as to be described with more details below.

In some examples, network platform 108 may receive a request to schedule the follow-on interaction upon detecting that the two parties intend to schedule the follow-on interaction, and may direct the parties to a portal to schedule the interaction. The detection can be based on, for example, performing text analysis on the messages in an instant messaging session, detecting certain online activities of the parties (e.g., making an online payment), etc.

At step 408, as part of the scheduling process, network platform 108 further generates a pairing code (e.g., pairing code 209) for establishing a peer-to-peer wireless connection between mobile devices 112 and 114 to authenticate both devices (and the associated parties) for the follow-on interaction. The pairing code may be generated based on, for example, an interaction identifier (e.g., "interaction ID" in FIG. 2A) associated with the scheduled interaction.

At step 410, as part of the scheduling process, mobile device 112 can transmit a first handshake code (e.g., handshake code 210) to network platform 108. The first handshake code may be generated by party 102 and/or automatically generated by mobile device 112. In some examples, the first handshake code may be encrypted with a public key of a target device (e.g., mobile device 114), as described above.

At step 412, as part of the scheduling process, mobile device 114 can transmit a second handshake code (e.g., handshake code 214) to network platform 108. The second handshake code may be generated by party 104 and/or automatically generated by mobile device 114. In some examples, the first handshake code may be encrypted with a public key of a target device (e.g., mobile device 112), as described above.

At step 414, as part of the scheduling process, network platform 108 can transmit a first token (e.g., token 220) including the pairing code, the second handshake code (received from mobile device 114), and the scheduling information (e.g., time and location, and other additional information related to the interaction) to mobile device 112. As to be discussed in FIG. 5, mobile device 112 can extract, from the first token, the scheduling information of a scheduled follow-on interaction with party 104, the pairing code, and the second handshake code. The pairing code can be used to authenticate mobile device 112 to mobile device 114, whereas the second handshake code can be used to confirm to party 104 (via mobile device 114) that party 102 is authorized to engage in the scheduled follow-on interaction with party 104.

At step 416, as part of the scheduling process, network platform 108 can transmit a second token (e.g., token 222) including the pairing code, the first handshake code (received from mobile device 112), and the scheduling information to mobile device 114. As to be discussed in FIG. 5, mobile device 114 can also extract, from the second token, the scheduling information of the scheduled follow-on interaction with party 102, the pairing code, and the first handshake code. The pairing code can be used to authenticate mobile device 114 to mobile device 112 and vice versa, whereas the first handshake code can be used to confirm to party 102 (via mobile device 112) that party 104 is authorized to engage in the scheduled follow-on interaction with party 102.

Subsequently, mobile device 112 can store the first token at step 418 whereas mobile device 114 can store the second token at step 420. In some examples, steps 406, 408, 414, and 416 can be performed by offline follow-on interaction scheduling module 204 of FIG. 2A.

Following the sequence of operations of FIG. 4, the two mobile devices may approach the location of the scheduled follow-on interaction at the scheduled time. The two mobile devices can then perform a set of authentication and authorization operations based on the information extracted from the first token and from the second token. Based on the result of the authentication and authorization operations, the mobile devices (and the parties) can determine whether to proceed with the scheduled follow-on interaction. FIG. 5 is a flowchart of a method 500 for authenticating and authorizing two mobile devices (e.g., mobile devices 112 and 114) and the associated parties (e.g., parties 102 and 104) for a follow-on interaction.

At step 502, mobile device 112 can retrieve the scheduling information of a follow-on interaction from the first token. Step 502 can be performed by management module 234 of mobile device 112 automatically and periodically to determine whether there is an upcoming follow-on interaction. Step 502 can also be performed in response to a user command.

At step 504, mobile device 114 can retrieve the scheduling information of the follow-on interaction from the second token. Step 504 can be performed by management module 234 of mobile device 114 automatically and periodically to determine whether there is an upcoming follow-on interaction. Step 504 can also be performed in response to a user command.

At step 506, mobile device 112 can initiate the authentication process based on determining, for example, that a current location of mobile device 112 is close to the location of the scheduled follow-on interaction, the current time at mobile device 112 is close to the scheduled time for the follow-on interaction, etc. The determination can be based on the scheduling information extracted from the first token.

At step 508, mobile device 114 can also initiate an authentication process based on determining, for example, that a current location mobile device 114 is close to the location of the scheduled follow-on interaction, the current time at device 114 is close to the scheduled time for the follow-on interaction, etc. The determination can also be based on the scheduling information extracted from the second token.

At step 510, as part of the authentication process, mobile device 112 may retrieve the pairing code from the first token. The pairing code may be generated by a network platform based on an interaction identifier.

At step 512, mobile device 112 may broadcast the pairing code (or a first portion of the pairing code) together with one or more identifiers associated with mobile device 112. The broadcasting of the pairing code can be based on the BT wireless protocol. For example, mobile device 112 may be configured as an initiator device and may broadcast an advertisement signal including a combination of the universally unique identifier (UUID) of mobile device 112, the pairing code, and a Bluetooth Media Access Control (MAC) address of mobile device 112.

At step 514, as part of the authentication process, mobile device 114 may retrieve the pairing code from the second token. The pairing code may be generated by a network platform based on an interaction identifier and can be identical to the pairing code broadcasted by mobile device 112.

At step 516, mobile device 114 may also broadcast the pairing code (or a second portion of the pairing code) together with one or more identifiers associated with mobile device 114. Mobile device 114 may broadcast an advertisement signal including a combination of the universally unique identifier (UUID) of mobile device 114, the pairing code, and a Bluetooth Media Access Control (MAC) address of mobile device 114.

At step 518, mobile device 112 may verify the received pairing code (e.g., received from mobile device 114), whereas at step 520 mobile device 114 may verify the received pairing code (e.g., received from mobile device 112). The verification may include comparing the received pairing code with part of or the entirety of the pairing code extracted from the first token (at mobile device 112) or from the second token (at mobile device 114). For example, at step 518 mobile device 112 may expect to receive a second portion of the pairing code which, when combined with the first portion of the pairing code broadcasted by mobile device 112, can form the entirety of the pairing code. Also, at step 520 mobile device 114 may expect to receive a first portion of the pairing code which, when combined with the second portion of the pairing code broadcasted by mobile device 114, can also form the entirety of the pairing code. The result of the verification may be used to authenticate mobile devices 112 and 114 as well as the associated parties.

At step 522, upon verifying the received pairing codes, mobile devices 112 and 114 can establish a wireless peer-to-peer communication channel between the two devices. The wireless peer-to-peer communication channel may be formed based on the BT wireless protocol and enables mobile devices 112 and 114 to exchange messages.

At step 524, mobile device 112 may display an authorization interface to party 102 to prompt party 102 to re-enter first handshake code (e.g., code 250). Mobile device 112 then transmits the first handshake code to mobile device 114, at step 526.

At step 528 (which can occur concurrently with step 524), mobile device 114 may also display an authorization interface to party 104 to prompt party 104 to re-enter second handshake code (e.g., code 260). Mobile device 114 then transmits the second handshake code to mobile device 112, at step 530 (which can also occur concurrently with step 526).

At step 532, mobile device 112 may verify the received second handshake code. The verification may include, for example, mobile device 112 retrieving an encrypted second handshake code from the storage (e.g., by extracting the encrypted code from token 220). The second handshake code may have been encrypted with a public key of mobile device 112. Mobile device 112 can decrypt the encrypted second handshake code using the private key of mobile device 112, and compare the decryption result with the code received in step 530.

At step 534 (which can also occur concurrently with step 532), mobile device 114 may verify the received first handshake code. The verification may include, for example, mobile device 114 retrieving an encrypted first handshake code from the storage (e.g., by extracting the encrypted code from token 222). The first handshake code may have been encrypted with a public key of mobile device 114. Mobile device 114 can decrypt the encrypted first handshake code using the private key of mobile device 114, and comparing the decryption result with the code received in step 526.

At step 536, upon verifying the first handshake code and the second handshake code respectively, mobile devices 112 and 114 can perform one or more actions to facilitate the scheduled interaction. The one or more actions may include, for example, generating an indication to each party that the follow-on interaction (e.g., an in-person interaction) may proceed, maintaining the peer-to-peer wireless communication channel (which may otherwise be discontinued if the devices cannot confirm that parties are authorized) to allow exchange of addition electronic information between the two parties, etc.

V. Example Device

Figure 6:
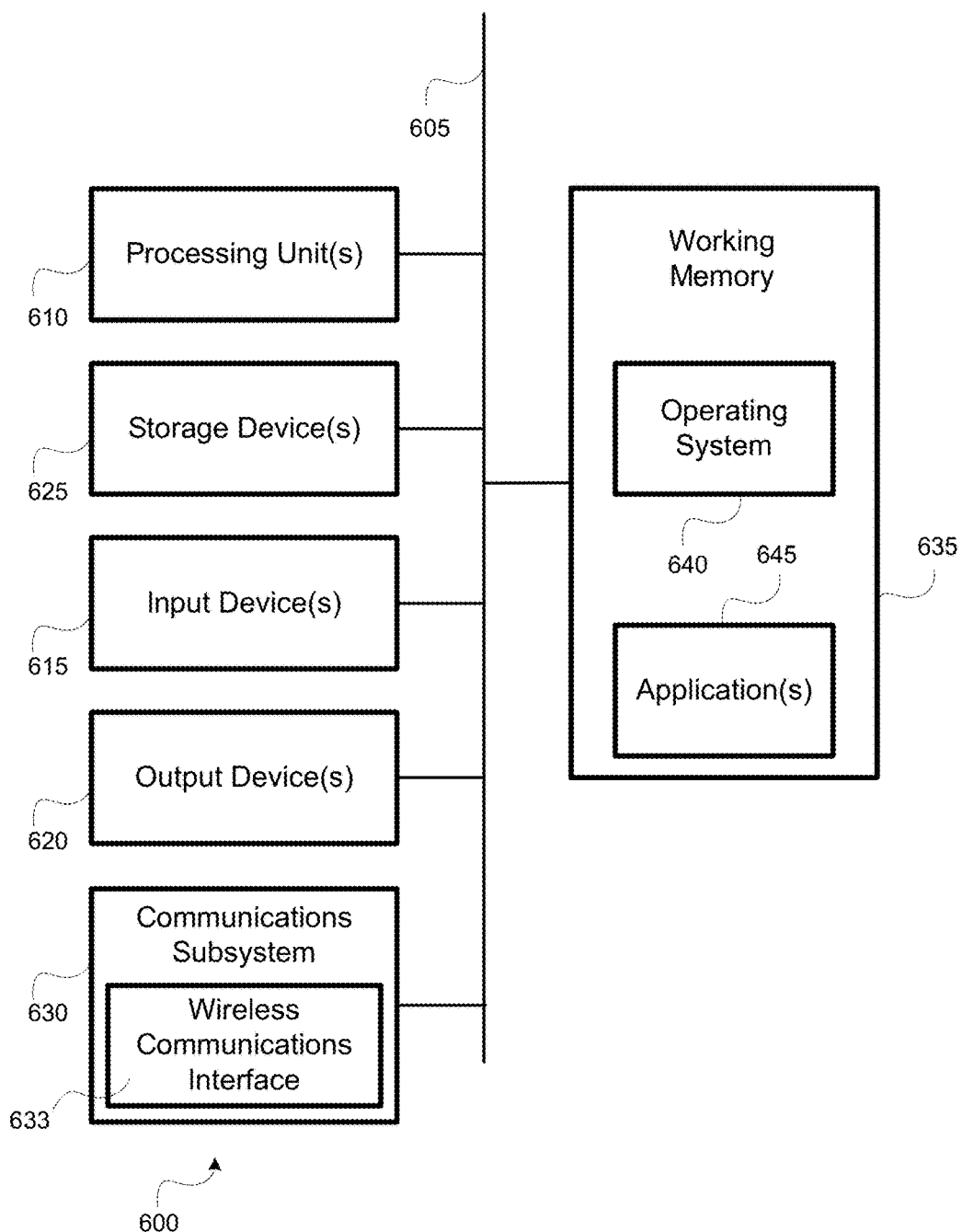
FIG. 6 is a block diagram of an example computer that can implement techniques disclosed herein.

FIG. 6 illustrates an embodiment of a computer system 600, which may be utilized and/or incorporated into one or more electronic components of a mobile device (e.g., mobile devices 112, 114, and 230). FIG. 6 provides a schematic illustration of one embodiment of a computer system 600 that can perform the methods provided by various other embodiments, such as the methods described in relation to FIG. 3, FIG. 4, and FIG. 5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processing chips, graphics acceleration processors, and/or the like), and/or other processing structures, which can be configured to perform one or more of the methods described herein, including the methods described in relation to FIG. 3, FIG. 4, and FIG. 5. The computer system 600 also can include one or more input devices 615, which can include without limitation a mouse, a keyboard, a camera, a microphone, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 may also include a communications subsystem 630, which can include support of wireline communication technologies and/or wireless communication technologies (in some embodiments) managed and controlled by a wireless communication interface 633. The communications subsystem 630 may include a modem, a network card (wireless or wired), an infrared communication device, a wireless communication device, and/or a chipset, and/or the like. The communications subsystem 630 may include one or more input and/or output communication interfaces, such as the wireless communication interface 633, to permit data to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 600 will further comprise a working memory 635, which can include a RAM and/or or ROM device. Software elements, shown as being located within the working memory 635, can include an operating system 640, device drivers, executable libraries, and/or other code, such as application(s) 645, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIG. 3, FIG. 4, and FIG. 5, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

All patents, patent applications, publications, and descriptions mentioned herein are incorporated by reference in their entirety for all purposes. None is admitted to be prior art.

What is claimed is:

1. A method, comprising:
transmitting, by a first device to a server, a request to initiate an offline interaction with a second device, the offline interaction not hosted by the server, the request including credential information of a first party associated with the first device;
receiving, by the first device from the server, a pairing code and a first handshake code, the pairing code for authenticating the second device and the first handshake code for authorizing a second party associated with the second device to engage in the offline interaction with the first party, the pairing code and the first handshake code being provided to the first device after the server authenticates the first party using the credential information;
transmitting, by the first device, at least a first portion of the pairing code in a first broadcast message that is capable of being detected by the second device;
receiving, by the first device from the second device, a second broadcast message;
authenticating, by the first device, the second device based on at least a second portion of the pairing code in the second broadcast message;
responsive to authenticating the second device, establishing, by the first device, a wireless peer-to-peer communication channel with the second device;
receiving, by the first device from the second device, a second handshake code via the wireless peer-to-peer communication channel;
authorizing, by the first device, the second party to engage in the offline interaction with the first party based on a relationship between the first handshake code and the second handshake code; and
responsive to authorizing the second party, performing, by the first device, one or more actions to facilitate the offline interaction.

2. The method of claim 1, further comprising:
splitting, by the first device, the pairing code into the first portion and the second portion;
transmitting, by the first device, the first portion of the pairing code; and
authenticating the second device based on determining that the second portion of the pairing code included in the second broadcast message and the first portion of the pairing code form the pairing code.

3. The method of claim 1, wherein each of the first portion of the pairing code and each of the second portion of the pairing code comprises an entirety of the pairing code.

4. The method of claim 1, wherein authorizing the second party to engage in the offline interaction with the first party based on a relationship between the first handshake code and the second handshake code comprises determining that the second handshake code is identical to the first handshake code.

5. The method of claim 1, wherein the first handshake code is encrypted with a public key of the first device and is capable of being decrypted only with a private key of the first device; and
wherein the method further comprises:
decrypting, by the first device, the first handshake code using the private key of the first device; and
authorizing the second party based on comparing the decrypted first handshake code with the second handshake code.

6. The method of claim 1, further comprising:
transmitting, by the first device to the server, a third handshake code before transmitting the broadcast message, to enable the server to transmit the third handshake code to the second device; and
transmitting, by the first device to the second device, a fourth handshake code via the wireless peer-to-peer communication channel, to enable the second device to authorize the first party to engage in the offline interaction with the second party based on a relationship between the third handshake code and the fourth handshake code.

7. The method of claim 1, further comprising:
transmitting, by the first device to the second device, a copy of the first handshake code via the wireless peer-to-peer communication channel to enable the second device to authorize the first party to engage in the offline interaction with the second party.

8. The method of claim 1, further comprising:
receiving, by the first device from the server, scheduling information for the offline interaction; and
transmitting, by the first device, the first broadcast message based on determining that a current time at the first device and a current location of the first device match, respectively, a scheduled time and a scheduled location included in the scheduling information.

9. The method of claim 8, further comprising: receiving, by the first device from the server, a token that includes the scheduling information, the pairing code, and the first handshake code.

10. An apparatus comprising:
a memory that stores a set of instructions; and
a hardware processor configured to execute the set of instructions to:
transmit, to a server, a request to initiate an offline interaction with a second device, the offline interaction not hosted by the server, the request including credential information of a first party associated with the apparatus;
receive, from the server, a pairing code and a first handshake code, the pairing code for authenticating the second device and the first handshake code for authorizing a second party associated with the second device to engage in the offline interaction with the first party, the pairing code and the first handshake code being provided to the apparatus after the server authenticates the first party using the credential information;

transmit at least a first portion of the pairing code in a first broadcast message that is capable of being detected by the second device;

receive, from the second device, a second broadcast message;

authenticate the second device based on at least a second portion of the pairing code in the second broadcast message;

responsive to authenticating the second device, establish a wireless peer-to-peer communication channel with the second device;

receive, from the second device, a second handshake code via the wireless peer-to-peer communication channel;

authorize the second party to engage in the offline interaction with the first party based on a relationship between the first handshake code and the second handshake code; and responsive to authorizing the second party, perform one or more actions to facilitate the offline interaction.

11. The apparatus of claim 10, wherein the hardware processor is further configured to:
split the pairing code into the first portion and the second portion;
transmit the first portion of the pairing code; and
authenticate the second device based on determining that the second portion of the pairing code included in the second broadcast message and the first portion of the pairing code form the pairing code.

12. The apparatus of claim 10, wherein each of the first portion of the pairing code and each of the second portion of the pairing code comprises an entirety of the pairing code.

13. The apparatus of claim 10, wherein authorizing the second party to engage in the offline interaction with the first party based on a relationship between the first handshake code and the second handshake code comprises determining that the second handshake code is identical to the first handshake code.

14. The apparatus of claim 10, wherein the first handshake code is encrypted with a public key of the apparatus and is capable of being decrypted only with a private key of the apparatus; and
wherein the hardware processor is further configured to:
decrypt the first handshake code using the private key of the apparatus; and
authorize the second party based on comparing the decrypted first handshake code with the second handshake code.

15. The apparatus of claim 10, wherein the hardware processor is further configured to:
transmit, to the server, a third handshake code before transmitting the broadcast message, to enable the server to transmit the third handshake code to the second device; and
transmit, to the second device, a fourth handshake code via the wireless peer-to-peer communication channel, to enable the second device to authorize the first party to engage in the offline interaction with the second party based on a relationship between the third handshake code and the fourth handshake code.

16. The apparatus of claim 10, wherein the hardware processor is further configured to:

transmit, to the second device, a copy of the first handshake code via the wireless peer-to-peer communication channel to enable the second device to authorize the first party to engage in the offline interaction with the second party.

17. The apparatus of claim 10, wherein the hardware processor is further configured to:
receive, from the server, scheduling information for the offline interaction; and
transmit the first broadcast message based on determining that a current time at the apparatus and a current location of the first device match, respectively, a scheduled time and a scheduled location included in the scheduling information.

18. The apparatus of claim 17, wherein the hardware processor is further configured to:
receive, from the server, a token that includes the scheduling information, the pairing code, and the first handshake code.

19. A non-transitory computer-readable medium having stored thereon instructions that, when executed by one or more processors, cause the one or more processors to:
transmit, to a server, a request to initiate an offline interaction with a second device, the offline interaction not hosted by the server, the request including credential information of a first party associated with a first device;

receive, from the server, a pairing code and a first handshake code, the pairing code for authenticating the second device and the first handshake code for authorizing a second party associated with the second device to engage in the offline interaction with the first party, the pairing code and the first handshake code being provided to the first device after the server authenticates the first party using the credential information;

transmit at least a first portion of the pairing code in a first broadcast message that is capable of being detected by the second device;

receive, from the second device, a second broadcast message;

authenticate the second device based on at least a second portion of the pairing code in the second broadcast message;

responsive to authenticating the second device, establish a wireless peer-to-peer communication channel with the second device;

receive, from the second device, a second handshake code via the wireless peer-to-peer communication channel;

authorize the second party to engage in the offline interaction with the first party based on a relationship between the first handshake code and the second handshake code; and responsive to authorizing the second party, perform one or more actions to facilitate the offline interaction.

20. The non-transitory computer-readable medium of claim 19, wherein the instructions, when executed by the one or more processors, cause the one or more processors to:
transmit, to the server, a third handshake code before transmitting the broadcast message, to enable the server to transmit the third handshake code to the second device; and transmit, to the second device, a fourth handshake code via the wireless peer-to-peer communication channel, to enable the second device to authorize the first party to engage in the offline interaction with the second party based on a relationship between the third handshake code and the fourth handshake code.

\* \* \* \* \*